(12) United States Patent
Wildermuth et al.

(10) Patent No.: US 10,413,849 B2
(45) Date of Patent: Sep. 17, 2019

(54) FILTER ELEMENT COMPRISING HOLLOW CYLINDRICAL FILTER MEDIUM BODY AND FILTER DEVICE

(71) Applicant: MANN+HUMMEL GMBH, Ludwigsburg (DE)

(72) Inventors: Andreas Wildermuth, Marbach (DE); Guenter Jokschas, Murrhardt (DE); Oliver Glueck, Stuttgart (DE); Marco Faisst, Besigheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 723 days.

(21) Appl. No.: 14/817,798

(22) Filed: Aug. 4, 2015

(65) Prior Publication Data

US 2016/0038861 A1 Feb. 11, 2016

(30) Foreign Application Priority Data

Aug. 5, 2014 (DE) .................. 10 2014 011 392

(51) Int. Cl.
| | |
|---|---|
| *B01D 29/21* | (2006.01) |
| *B01D 35/153* | (2006.01) |
| *B01D 35/16* | (2006.01) |

(52) U.S. Cl.
CPC ............ *B01D 29/21* (2013.01); *B01D 35/153* (2013.01); *B01D 35/16* (2013.01); *B01D 2201/0415* (2013.01); *B01D 2201/291* (2013.01); *B01D 2201/305* (2013.01); *B01D 2201/4015* (2013.01); *B01D 2201/4046* (2013.01); *B01D 2201/4084* (2013.01)

(58) Field of Classification Search
CPC ...... B01D 29/21; B01D 35/153; B01D 35/16; B01D 2201/4084; B01D 2201/4046; B01D 2201/4015; B01D 2201/291; B01D 2201/0415; B01D 2201/305
See application file for complete search history.

(56) References Cited

U.S. PATENT DOCUMENTS

| | | | | |
|---|---|---|---|---|
| 2004/0261383 | A1* | 12/2004 | Schaerlund | B01D 46/0024 55/498 |
| 2007/0102336 | A1 | 5/2007 | Komine et al. | |

FOREIGN PATENT DOCUMENTS

| | | |
|---|---|---|
| DE | 202005014451 U1 | 2/2007 |
| DE | 102012002726 A1 | 8/2013 |
| EP | 1702663 A1 | 9/2006 |

* cited by examiner

*Primary Examiner* — Krishnan S Menon
*Assistant Examiner* — Waqaas Ali
(74) *Attorney, Agent, or Firm* — James Hasselbeck

(57) ABSTRACT

A filter element comprises a hollow cylindrical filter medium body, on the inside of which there is arranged a support frame that is a carrier of at least one installation rib protruding radially inward with respect to the support frame.

5 Claims, 9 Drawing Sheets

FILTER ELEMENT COMPRISING HOLLOW CYLINDRICAL FILTER MEDIUM BODY AND FILTER DEVICE

TECHNICAL FIELD

The invention relates to a filter element comprising a hollow, cylindrical, radial flow through or flow permeable filter medium body, as well as a filter device comprising a filter element, a filter housing, and a housing cover. The filter element can be used to purify fluids. Preferably, the fluid is a liquid, e.g., fuel or oil.

BACKGROUND

There are known hollow cylindrical filter elements that are used in liquid filters, e.g., to filter oil, and that comprise a filter medium body through which there is to be a radially inward flow from the outside. In the cylindrical interior space, there is a support frame that imparts stability to the filter medium body, which is composed of a non-woven material or a paper material. End caps are located at the end faces of the filter medium body, and the cylindrical interior space constitutes the clean side from which the purified fluid is axially discharged. For example, patent document EP 1 702 663 A1 describes such a filter element.

The filter element is used in a filter housing, and the filter element and filter housing together form a filter device. The filter housing is provided with ports for the supply of the crude fluid and the discharge of the pure fluid. For the purpose of fastening, the filter element may be inserted into a pot-shaped cover that can be placed on the housing and is intended to be connected thereto via suitable fastening devices. For example, the cover may be bolted to the filter housing.

SUMMARY OF THE INVENTION

The invention addresses the problem of providing a hollow cylindrical filter element with which simple measures are taken so that an unambiguous assignment to a filter housing is given and accidental insertion of a non-fitting filter element into a filter housing is precluded.

The filter element according to the invention comprises a hollow cylindrical filter medium body, through which a fluid flows in the radial direction—typically radially inward from the outside. The filter element may be used for a filter device with which the filter element is inserted into a dedicated filter housing. The filter device entails, for example, a liquid filter such as, for example, for an oil filter or a fuel filter. However, use for gas filtration may also be considered.

Arranged on the inside of the hollow cylindrical filter medium body is a support frame that serves to support and improve the stability of the filter medium body. The filter medium body is composed, for example, of a non-woven fabric or paper material, or of mixed fibers such as cellulose and polyester, and may have a folded shape. The support frame is preferably composed of a plastic material.

The interior space in the filter medium body is configured so as to be cylindrical, and accordingly the support frame arranged on the inside has the shape of a hollow cylinder.

In the filter element according to the invention, the support frame is a carrier of at least one installation rib protruding radially inward and having an end face that forms a support surface for a support dome which protrudes axially into the filter medium body. The support dome is arranged on the housing side and preferably extends so as to be coaxial to the filter element, wherein, in the case of a non-fitting filter element, the support dome reaches contact with the end face of the installation rib, which is supported on the support dome. If the support dome and the filter element do not fit together, then a correct installation of the filter element into the filter housing is precluded. The installation rib lying radially inward ensures that only a filter element that fits can be placed in the filter housing.

The installation rib projects radially inwardly beyond the support frame and forms, on the support frame, the component that protrudes the farthest radially inward. Furthermore, the installation rib extends further radially inward than a boundary of the opening in the end cap, through which the support dome can protrude into the filter element. The filter element can be correctly installed in the dedicated filter housing either if a support dome is omitted on the part of the filter housing or if the support dome is adapted to the corresponding filter element. If, however, there is a support dome in the filter housing to which the filter element is not adapted, then it is impossible to correctly install the filter element.

For reasons of symmetry, it may be suitable to provide a plurality of installation ribs on the support frame, for example, two diametrically opposed installation ribs that each extend radially inward relative to the support frame. In order to influence the flow conditions in the interior space of the filter element so as to be only as low as is possible, it may be suitable for the installation rib or installation ribs to extend radially only slightly inward, e.g., to a maximum of 25% or a maximum of 20% with respect to the inner diameter of the interior space. The radial wall thickness of the support frame is smaller than the radial extension of the installation rib; the installation rib extends radially inward, for example, by at least twice but not more than five times the wall thickness of the support frame.

Optionally, more than two installation ribs are arranged on the inside of the support frame, e.g., three or four installation ribs distributed over the circumference.

According to another advantageous embodiment, the installation rib is formed integrally with the support frame. The support frame is configured, for example, as a plastic injection-molded component, such that the installation rib is also made by injection molding.

According to a further suitable embodiment, the support frame comprises a plurality of axially extending longitudinal braces, as well as circumferential braces that connect the longitudinal braces, wherein flow openings for the passage of the fluid to be purified are formed between the longitudinal braces and the circumferential braces. The installation rib is suitably located on a longitudinal brace, whereby the free cross-sectional opening of the adjacent inlet openings is not or only slightly affected.

According to a further suitable embodiment, an end cap is respectively present on at least one end face of the filter medium body, preferably at both opposite end faces. At least one end cap is a carrier of a sealing ring, which separates the pure side from the crude side in the installed state of the filter element. The sealing ring is located on the end cap-side opening of the interior space in the filter element, and engages advantageously in an installation position with a discharge opening that is closed off by the sealing ring when the filter element is inserted but is released and forms a discharge opening for the fluid upon removal of the filter element.

In accordance with a preferred embodiment, the sealing ring comprises at least one circumferential sealing groove both on the outside thereof and on the inside thereof, each, and optionally comprises two axially spaced circumferential sealing grooves on the outside and on the inside, each. Upon axial removal of the filter element from the seal seat thereof in the installation position in the filter housing, the sealing ring is lifted out from the discharge opening in the housing, wherein the sealing ring inner side initially still rests against a connecting piece in the housing, whereas the sealing ring outer side lies exposed and the discharge opening releases. This makes it possible for the crude fluid in the filter housing to flow out via the discharge opening, while the interior space in the filter element, which forms the clean side and receives the pure fluid, initially remains closed. Only with complete removal of the filter element from the filter housing is the interior space in the filter element also released, so that the pure fluid located therein can also flow out via the discharge opening.

It may be suitable for the sealing ring to be configured integrally with the end cap on the filter element.

The filter device comprises the filter element as well as a filter housing and a pot-shaped housing cover, in which the filter element is received and which is connected to the filter housing via a connecting device. The connecting device is embodied, for example, as a threaded connection, formed by fitted screw threads on the filter housing and on the pot-shaped housing cover, into which the filter element is inserted. The housing cover is screwed with its thread onto the associated thread on the filter housing. As an alternative to a threaded connection, the connecting device may also be embodied mechanically in any other manner, e.g., as a snap hook or as a clip.

Another aspect of the invention relates to a filter device having a hollow cylindrical filter element that comprises a radial flowthrough-permitting filter medium body having a support frame on the inside. As a part of the filter device, there is a filter housing into which the filter element can be inserted, wherein a support dome is arranged in the filter housing, the support dome protruding into the interior space when the filter element is assembled or inserted. The filter element is received in a pot-shaped housing cover that is connected to the filter housing via a connecting device, e.g., a threaded connection. The support dome ensures that into the filter housing, it is only possible to insert filter elements that either lack radially inwardly protruding installation ribs in the support frame or are furnished with adapted installation ribs. This allows unambiguous assignment of the fitting filter element to the filter housing, and precludes accidental installation of a non-fitting filter element.

The support dome advantageously sits on a drain connection in the filter housing, with which the filter element is coaxially aligned. If the filter element does not fit the support dome, the end edge of the support dome rests on the support surface of the installation rib, so that the filter element cannot reach the axial installation position. If, however, the filter element and the filter housing do fit together with the support dome, then the support dome extends far into the support frame or into the interior space in the filter element, until the facing end cap or the sealing ring on the filter element has reached its installation position. At the same time, the connecting device provides a firm connection between the pot-shaped cover, which receives the filter element, and the filter housing.

A further advantageous embodiment relates to a construction set having two filter devices each having a filter element, wherein the first filter element comprises at least one installation rib on the inner support frame and is received in the filter housing without a support dome, whereas the second filter element has no installation ribs but is received in the filter housing with a support dome. Two differently designed filter elements are thus used: a first filter element having an installation rib and a second filter element without an installation rib. The filter elements may optionally differ from one another in size, e.g., having a different axial length with the same inner and outer diameter.

The support dome, which protrudes into the central opening in the end cap, comprises a wall that is designed as a lattice structure. The lattice structure is constructed, for example, out of longitudinal and circumferential braces and has a plurality of flow openings that allow a fluid, which has been passed through the filter element, to flow radially through. This ensures that the support dome does not pose a hindrance to the fluid flowing through.

Optionally, the lattice structure of the support dome is adapted to the lattice structure of the support frame in the filter element, so that the longitudinal and circumferential braces of the support dome and support frame lie on one another.

According to yet another suitable embodiment, at least one counter-support element is found on an end face of the support dome, the counter-support element corresponding to the end face of the installation rib on the inside of the support frame. The counter-support element is configured, for example, as a support incision into which the end face of the installation rib protrudes. Such a support incision is formed, for example, by two teeth on the support dome that are arranged adjacently to one another, wherein optionally a circumferential ring gear having a plurality of teeth extending in the circumferential direction is arranged in the support dome and a support incision is formed between each two adjacent teeth, the support incision forming a counter-support element to an installation rib. The support incision may be adapted to the geometry of the installation rib, so that only mutually fitting installation ribs and support domes can be joined together. It may be suitable for the number of installation ribs on the inside of the support frame to be adapted tot eh number of the counter-support elements, in particular the support incisions between adjacent teeth. In an alternative embodiment, the support frame comprises a smaller number of installation ribs than there are counter-support elements present on the support dome.

The end faces of the installation rib may be a part of a circumferential ring gear on the inside of the support frame, which engages with the ring gear on the support dome. The end faces of the installation ribs engage with the support incisions between the teeth of the ring gear on the support dome. Conversely, the tooth tips of the ring gear on the support dome protrude into the intermediate spaces between the installation ribs of the ring gear on the inside of the support frame.

When the filter element and support dome are axially joined together, the situation may occur that the end face of the installation rib or installation ribs strikes against the tips of the teeth, instead of in the support incisions present in between. In this case, a slight relative rotation between the filter element and the support dome suffices to ensure that the installation ribs engage with the support incisions between the teeth. The engagement of the installation ribs with the support incisions is supported by inclined flanks on the teeth running at an angle to the longitudinal axis, which is also the relative rotation axis.

According to a further suitable embodiment, the support dome comprises a base section, which is a carrier of the at least one counter-support element, as well as a guide section axially adjoining the base section, the guide section is in contact with the installation rib in the installed state, and is arranged radially inside of the counter-support element. The guide section provides for improved guidance and an enlarged contact surface between the support frame in the filter element and the support dome. This results in particular in an inclined position of the filter element relative to a housing longitudinal axis. The guide section has a smaller outer diameter than the base section, which is, in addition to the guide section, also a carrier of the at least one counter-support element. Due to the smaller outer diameter, the guide section is located radially inside the counter-support element. The counter-support element or laterally-defining walls of the counter-support element extend in the axial direction at least over a partial length of the guide section.

The base section and the guide section are advantageously each configured so as to be rotationally symmetrical. The base section is preferably configured so as to be cylindrical. The guide section having a reduced outer diameter may also be configured so as to be cylindrical or optionally even conical, wherein the guide section tapers toward the free end face thereof in the latter case.

According to a further suitable embodiment, the axially elongated guide section has a lattice structure including axial braces that run over the circumference as seen at the height of the counter-support elements, which are arranged at an end face of the base section. The counter-support elements are embodied, for example, as support incisions between two teeth of a circumferential ring gear, wherein the axial braces of the guide section are arranged at the height of the support incisions. In the installation, one or more installation ribs on the inside of the support frame of the filter element engage(s) with one or more support incisions, wherein the axial braces of the guide section lie directly on the inside of the installation ribs and are supported radially thereon.

According to a further suitable embodiment, the axial length of the guide section is at least half the axial length of the base section. This aspect ratio ensures that the guide section has a sufficiently large length to ensure the desired guidance and support, in particular, on one or more installation ribs on the inside of the support frame.

According to a further suitable embodiment, there are latching elements for latching with a filter housing, which are located in particular on the side of the support dome that lies opposite to the counter-support elements. There may be provided a plurality, for example, four such latching elements distributed, for example, over the circumference.

BRIEF DESCRIPTION OF THE DRAWINGS

Further advantages and suitable embodiments are to be taken from the additional claims, the description of the drawings, and the drawings.

Figure 1:
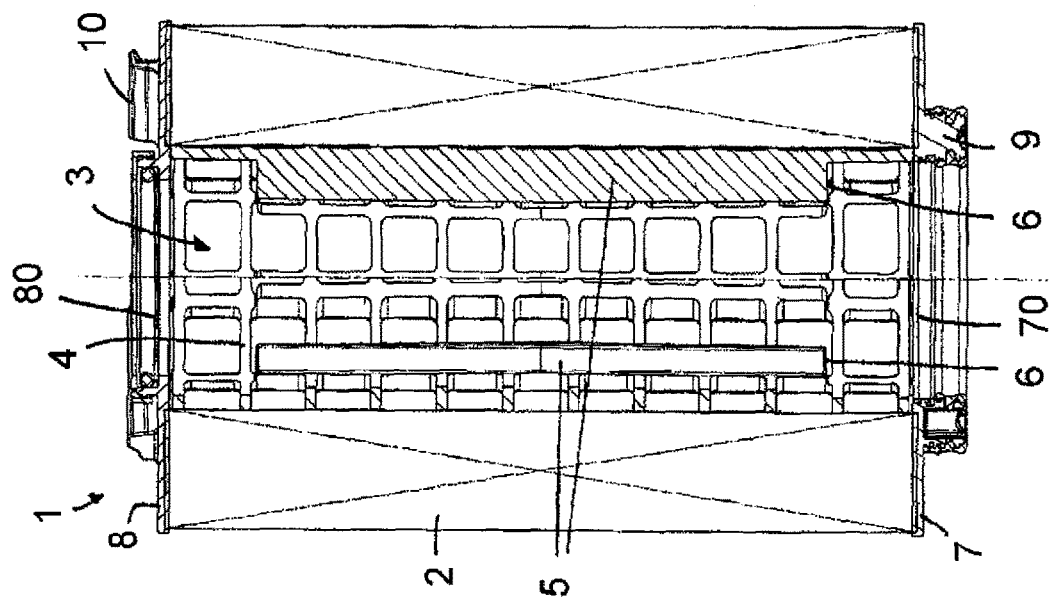
FIG. 1 illustrates a perspective sectional representation of a hollow cylindrical filter element having a filter medium body intended to have radial flowthrough and a support frame on the inside, wherein two installation ribs that are diametrically opposed and protrude radially inward are arranged on the support frame.

In the drawings, like components are provided with like reference signs.

Embodiment(s) of the Invention

Figure 2:
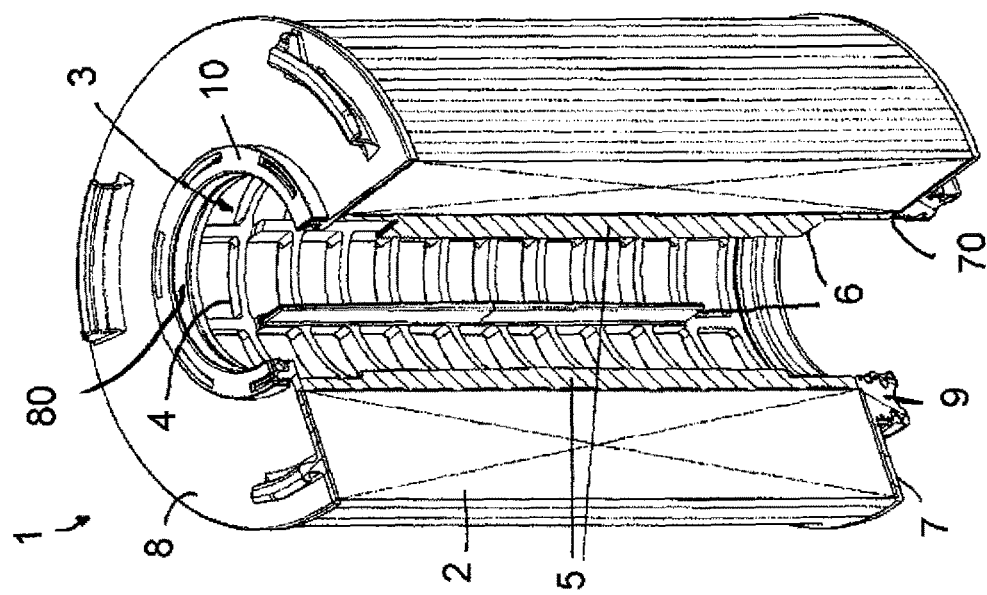
FIG. 2 illustrates a section lengthwise through the filter element according to FIG. 1.

FIGS. 1 and 2 depict a filter element 1 in a hollow cylindrical embodiment, which preferably is used for liquid filtration, in particular as an oil filter or as a fuel filter. The filter element 1 comprises a hollow cylindrical filter medium body 2, which is configured so as to have a folded shape and is composed of a non-woven material or paper material. The fluid intended to be purified flows through the filter medium body 2, radially inward from the outside, and the interior space 3 forms the clean side from which the purified fluid is axially discharged.

On the inside of the filter medium body 2, there is a support frame 4 lining the interior space 3, which adds stability to the filter medium body. The support frame 4, which is made of plastic, comprises longitudinal braces extending in the axial direction as well as circumferential braces running in the circumferential direction which connect the longitudinal braces, whereby a plurality of flowthrough openings via which the fluid can flow into the interior space 3 are formed between the longitudinal and circumferential braces in the support frame 4.

Integrally formed with the support frame 4, there are two installation ribs 5 that are arranged on the inside of the support frame so as to be diametrically opposite to one another and extend radially inward further than the other components of the support frame. The two installation ribs 5 each run along a longitudinal brace of the support frame 4. Each installation rib 5 comprises a smaller axial length than the filter element 1 and ends at an axial distance to the end faces of the filter element 1.

The end faces of the installation ribs 5 each form a support surface 6, which serves to be supported, in the event of an erroneous installation into a filter housing, against a stop that is formed in the filter housing and is intended to prevent the installation of a non-fitting filter element. In this case, it is impossible to completely insert the filter element 1 axially into the filter housing, such that the erroneous installation is obvious and can be corrected by the person who is attempting assembly.

At each end face, there are, on the filter medium body 2, respective ends cap 7, 8 that each have a central opening 70, 80 for the fluid. Sealing rings 9, 10 are respectively formed integrally with the end caps 7, 8, and are placed around the central openings 70, 80 in the filter element 1. The sealing ring 9 comprises two axially spaced circumferential sealing grooves on the inside as well as on the outside, each, and these sealing grooves enable compression of the sealing ring and support the sealing function. The opening 80 in the upper end cap is closed during operation, wherein, for example, a bypass valve can be inserted into the opening 80. The purified fluid can be discharged from the interior space of the filter element 1 via the opening 70 into the lower end cap 7.

Figure 3:
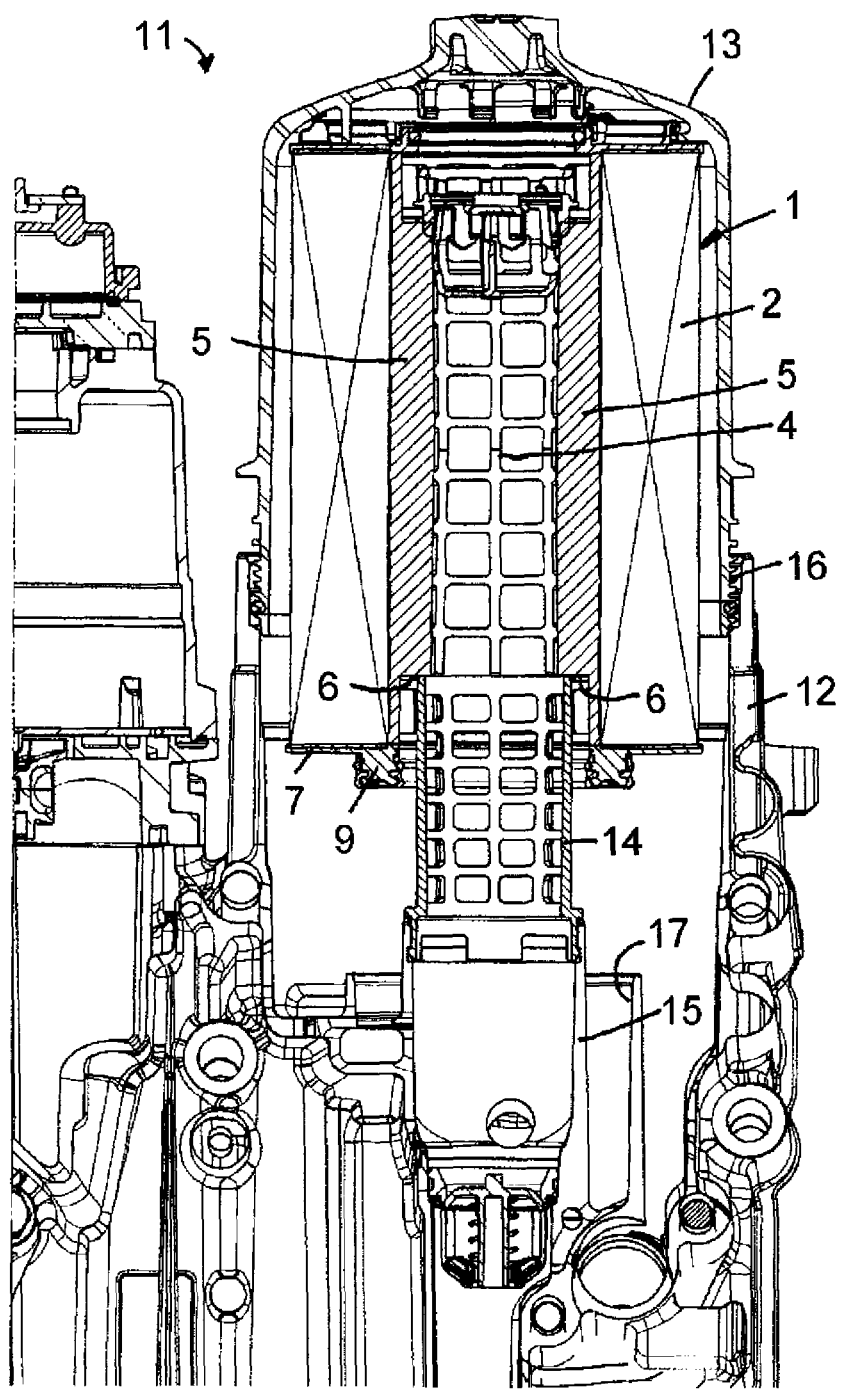
FIG. 3 illustrates a filter device having a filter element according to FIGS. 1 and 2 in a pot-shaped housing cover on a filter housing having a housing-side support dome, which is supported on the end face-side support surfaces of the installation ribs and prevents the mounting of the filter element.

FIG. 3 illustrates a non-operational filter device 11 for liquid filtration, which comprises the filter element 1 in a pot-shaped housing cover 13 and a filter housing 12. In FIG. 3, a non-fitting filter element 1 is received in the pot-shaped housing cover 13, with which a correct installation of the filter element 1 into the filter housing 12 is not possible. The end face-side support surfaces 6 on the installation ribs 5 are supported on the end edge of a support dome 14, and this prevents axial insertion of the filter element 1, including the housing cover 13, up to the point of reaching the final installation position. The support dome 14 rests on a housing-side drain connection 15, via which the purified fluid flows axially out from the interior space of the filter element 1. However, the support dome 14 hinders complete axial insertion of the filter element 1 into the filter housing 12, so that even the sealing ring 9 on the end cap 7 cannot come into engagement with a discharge opening 17 that annularly encloses the drain connection 15 and normally serves as runoff of the crude fluid located in the housing when the filter element 1 located in the in-use filter element 1 is removed.

On the outside of the pot-shaped housing cover 13 and adjacent to the end edge, there is an external thread which is a part of a threaded connection 16 and normally—when a correctly chosen filter element provided for this purpose is being used—can be threaded onto a corresponding internal thread on the filter housing 12. However, because the support dome 14 abuts the support surface 6 of the installation ribs 5 and correct insertion of the filter element 1 into the filter housing 12 is prevented, it is impossible to have a threaded connection via the threads on the housing cover 13 and on the filter housing 12. It is thus impossible to initiate operation of the filter device 11 with the non-fitting filter element 1.

Figure 4:
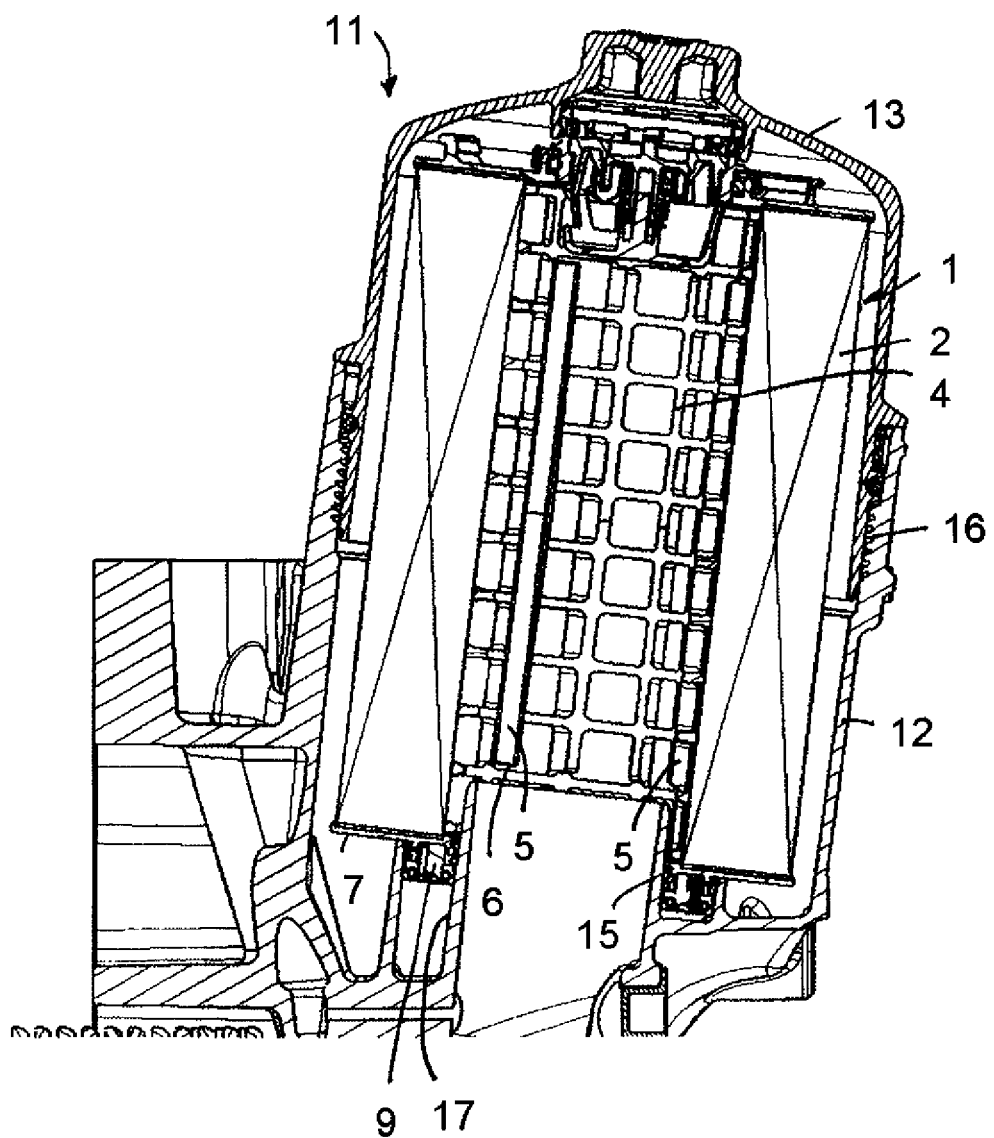
FIG. 4 illustrates a filter device having a filter element according to FIGS. 1 and 2 in an installation position in a filter housing without a support dome.

FIG. 4 depicts the filter element 1 in a correct installation position in a filter housing 12 of a filter device 11. The installation takes place without a support dome; the end face-side support surfaces 6 of the installation ribs 5 do not abut against any housing-side component. This makes it possible for the drain connection 15 to protrude axially into the interior space or the support frame 4; moreover, the sealing ring 9 is located in the circumferential discharge opening 17 that surrounds the drain connection 15. The threaded connection 16 is established, and the external thread on the pot-shaped housing 13 engages with an associated internal thread on the filter housing 12.

Figure 5:
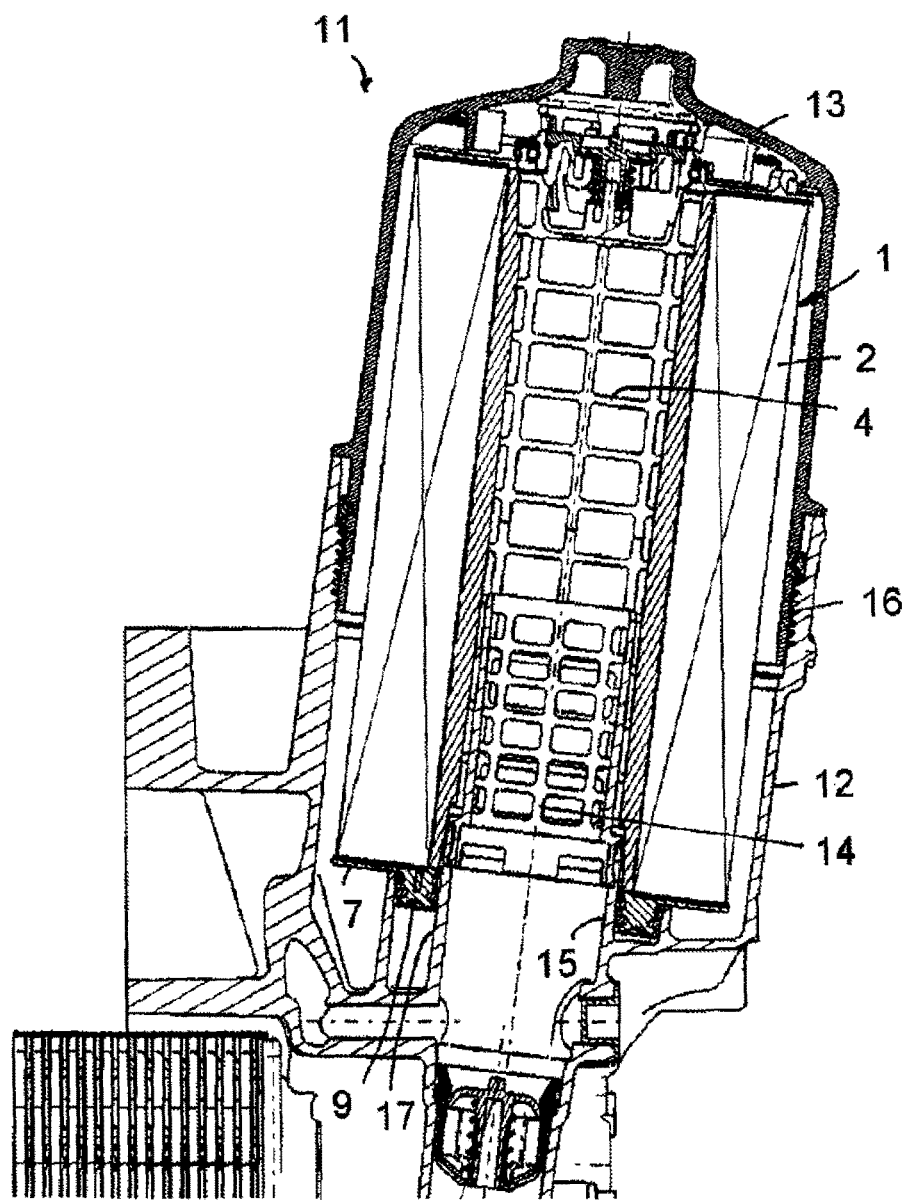
FIG. 5 illustrates a filter device having an alternatively embodied filter element without installation ribs, having a housing-side support dome protruding into the interior space of the filter element.

FIG. 5 depicts a filter element in an alternative embodiment, in the installation position in the filter housing 12 of the filter device 11. In contrast to the previous embodiments, the filter element 1 comprises a larger axial length; moreover, there are no radially inwardly protruding installation ribs provided on the support frame 4. In the filter housing, there is a support dome 14 that is mounted onto the central drain connection 15 in the filter housing and protrudes into the interior space or the support frame 4 of the filter element 1 when in the mounted position. The sealing ring 9 on the end cap 7 protrudes into the discharge opening 17 and closes same off. The threaded connection 16 between the pot-shaped housing cover 13 and the filter housing 12 is closed and the corresponding threads on the housing cover and on the filter housing engage with one another.

Figure 6:
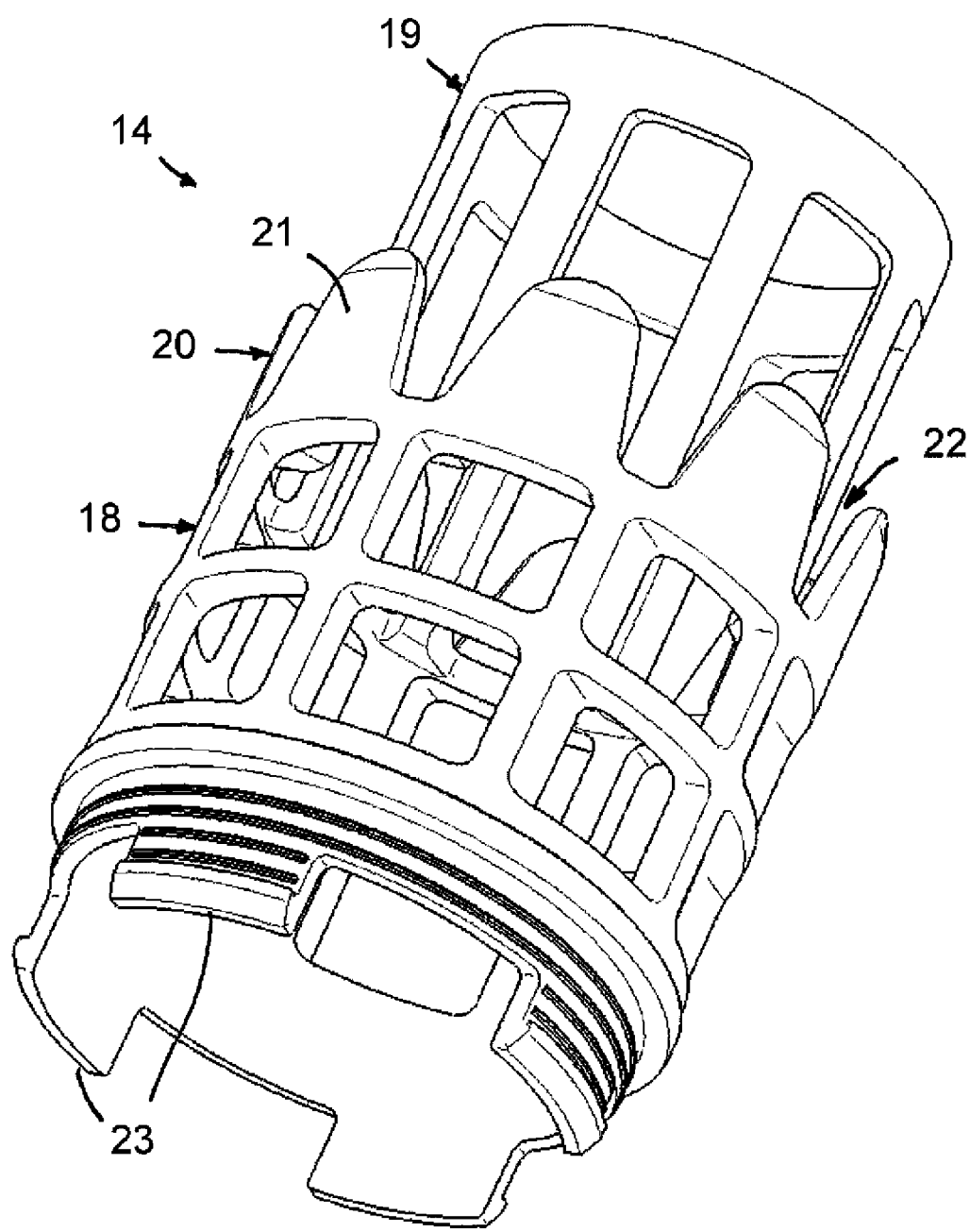
FIG. 6 illustrates a perspective view of a support dome.

FIG. 6 depicts a support dome 14 in another embodiment. The support dome 14 comprises a cylindrical base section 18 as well as a guide section 19 that is axially adjacent to the base section 18 and has a smaller outer diameter compared to the base section 18. The guide section 19 may also be configured so as to be cylindrical, or optionally provided with a slight conicity, so that the guide section 19 tapers slightly going toward the free end face thereof. Both the base section 18 and the guide section 19 have a lattice structure comprising longitudinal braces and circumferential braces between which flow openings for the radially passing fluid are formed.

At an end face of the base section 18 there is a circumferential ring gear 20 having a plurality of teeth 21 arranged so as to be uniformly distributed over the circumference, wherein a support incision 22 is formed between every two adjacent teeth 21, the support incisions 22 serving to receive one or more installation ribs 5 on the inside of the support frame 4. The support incisions 22 have a trapezoidal cross-section, which increases toward the free axial end face.

The teeth 21 of the ring gear 20 surround the guide section 19, which has a smaller outer diameter as compared to the base section 18. The ring gear 20 including the teeth 21 is formed integrally with the base section 18 and has the same diameter as the base section. The teeth 21 extend axially over a partial length of the guide section 19, the total length thereof being, however, smaller than the axial length of the base section 18 but at least 50% of the length of the base section 18. The longitudinal braces of the guide section 19 are located circumferentially at the height of the support incisions 22, which form counter-support elements with respect to the installation ribs. In the installed position, the longitudinal braces of the guide section 19 run parallel and radially inward relative to the installation ribs 5 on the support frame 4.

Arranged on the base section 18, on the end face lying axially opposite to the ring gear 20, are latching elements 23 that serve to latch with the filter housing. Four latching elements 23, which are formed integrally with the base section 18 of the support dome 14, are arranged so as to be uniformly distributed over the circumference.

Figure 7:
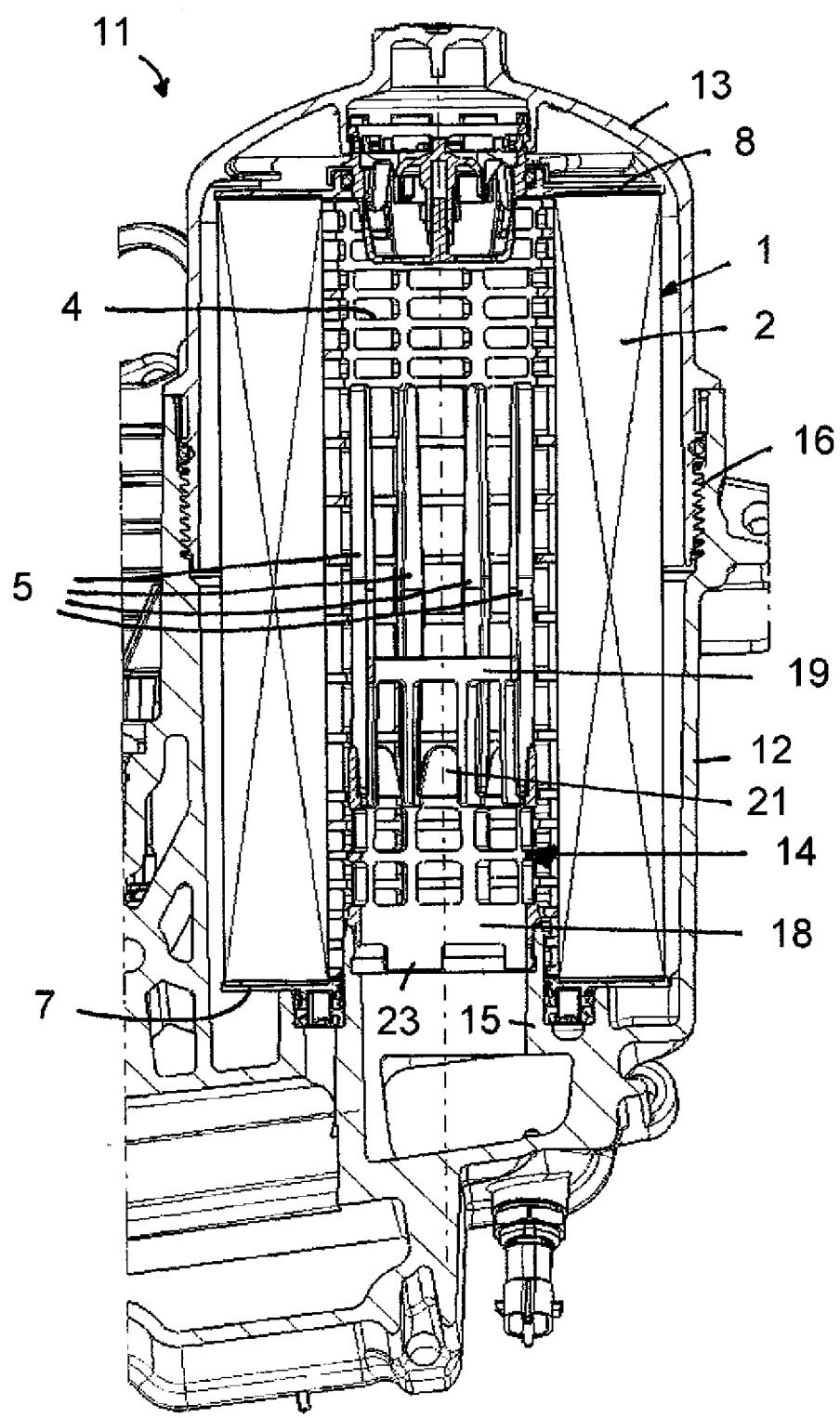
FIG. 7 illustrates a section through a filter device having a support dome according to FIG. 6 protruding into the interior space of the filter element.
Figure 8:
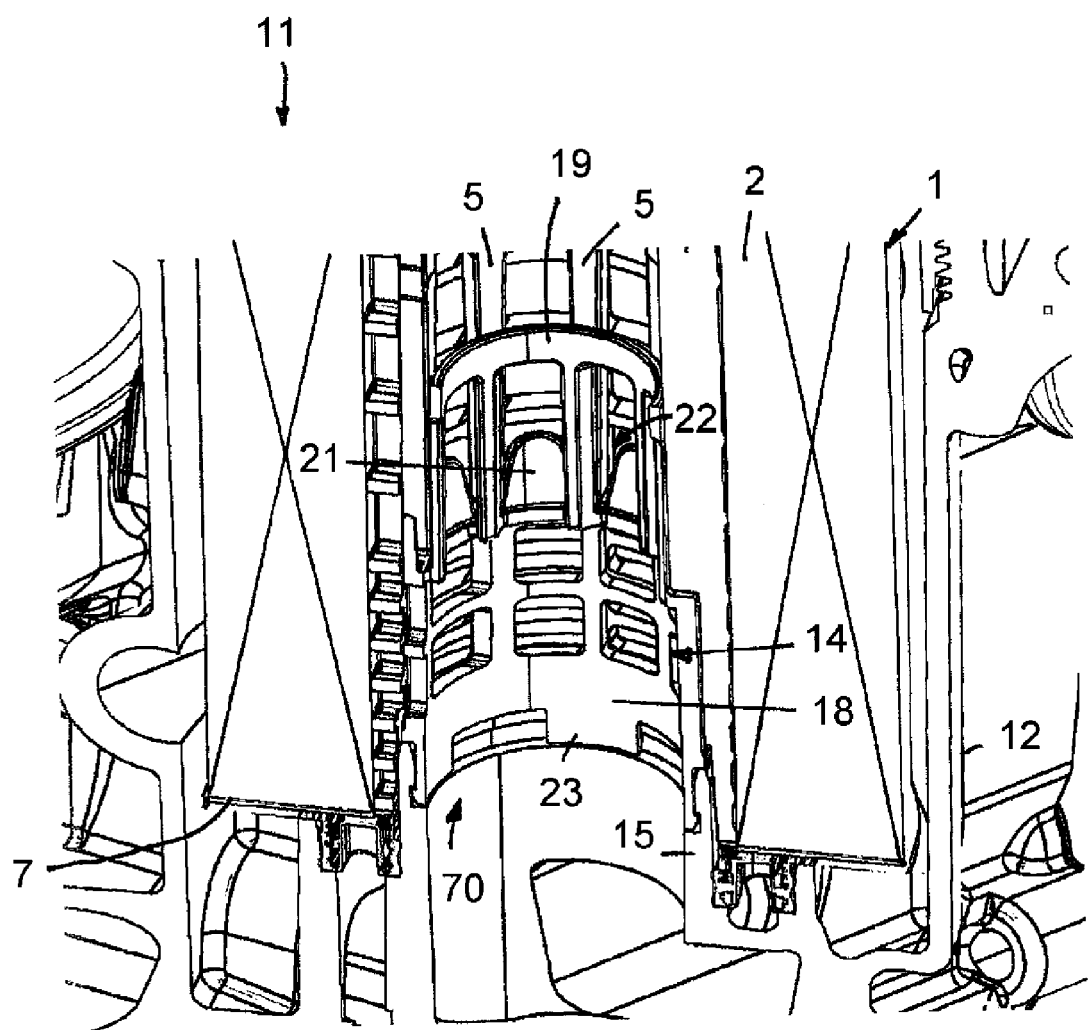
FIG. 8 illustrates an enlarged view of the filter device according to FIG. 7, having the support dome protruding into the filter element.
Figure 9:
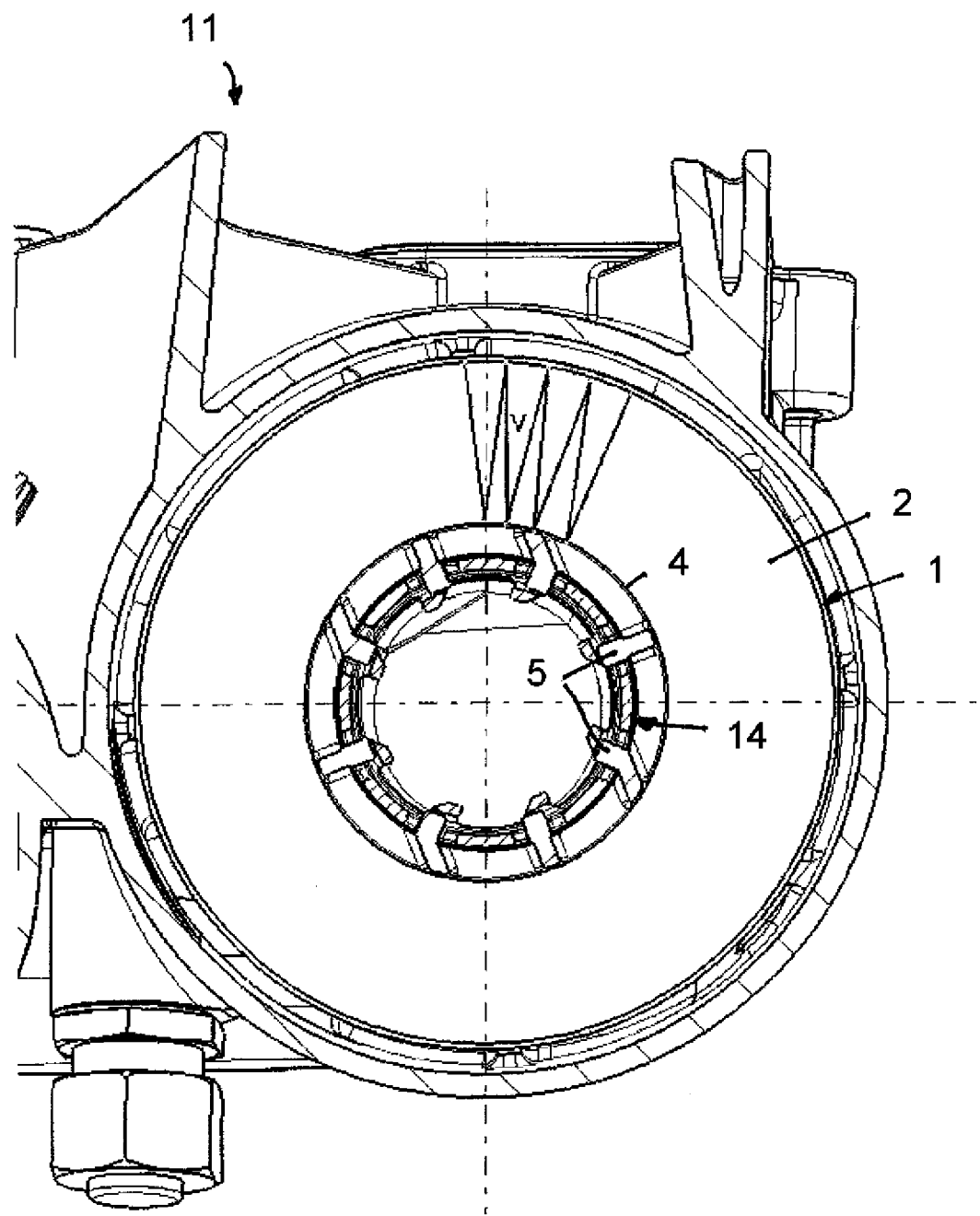
FIG. 9 illustrates a section across the longitudinal axis through the filter device according to FIG. 7 or 8.

FIG. 7 depicts a filter device 11 having a filter element 1 and a support dome 14 according to FIG. 6, while FIG. 8 illustrates an enlarged detail in the region of the support dome protruding into the interior space of the filter element, and FIG. 9 illustrates a section through the filter device across the longitudinal axis. The basic construction of the filter device 11 corresponds to that from FIG. 5, such that reference is made to the description thereof. What is different, however, is the construction of the support dome 14 and the support frame 4, which, according to FIGS. 7 to 9, has a plurality of installation ribs 5 distributed over the circumference; the installation ribs 5 extend in the axial direction and protrude radially furthest inward. The installation ribs 5 are formed integrally with the support frame 4 and are located on the radially inner side of the support frame. The installation ribs 5 have a smaller total axial length than the support frame 4, and the installation ribs 5 are, at both end end faces, spaced apart from the end faces of the support frame and thus also from the end caps of the filter element 1.

The end face of the installation ribs 5 that faces the filter housing 12 forms the support surface that protrudes into the support incision 22 on the support dome 14 between two teeth 21.

The end faces of the installation ribs 5 are a part of a circumferential ring gear on the inside of the support frame, which engages with the ring gear 29 on the support dome 14. The end faces of the installation ribs engage with the support incisions 22 between the teeth of the ring gear 20 on the support dome 14. Conversely, the tooth tips of the ring gear 20 on the support dome 14 protrude into the spaces between adjacent installation ribs 5 of the ring gear on the inside of the support frame 4.

The support dome 14 is located axially completely inside of the filter element 1. The drain connection 15 to which the support dome 14 is connected by the latching elements 23 thereof protrudes into the central opening 70 in the lower end cap 7 of the filter element 1.

As can additionally be seen in FIG. 9, the filter medium body 2 of the filter element 1 is embodied as a folded filter.

Figure 10:
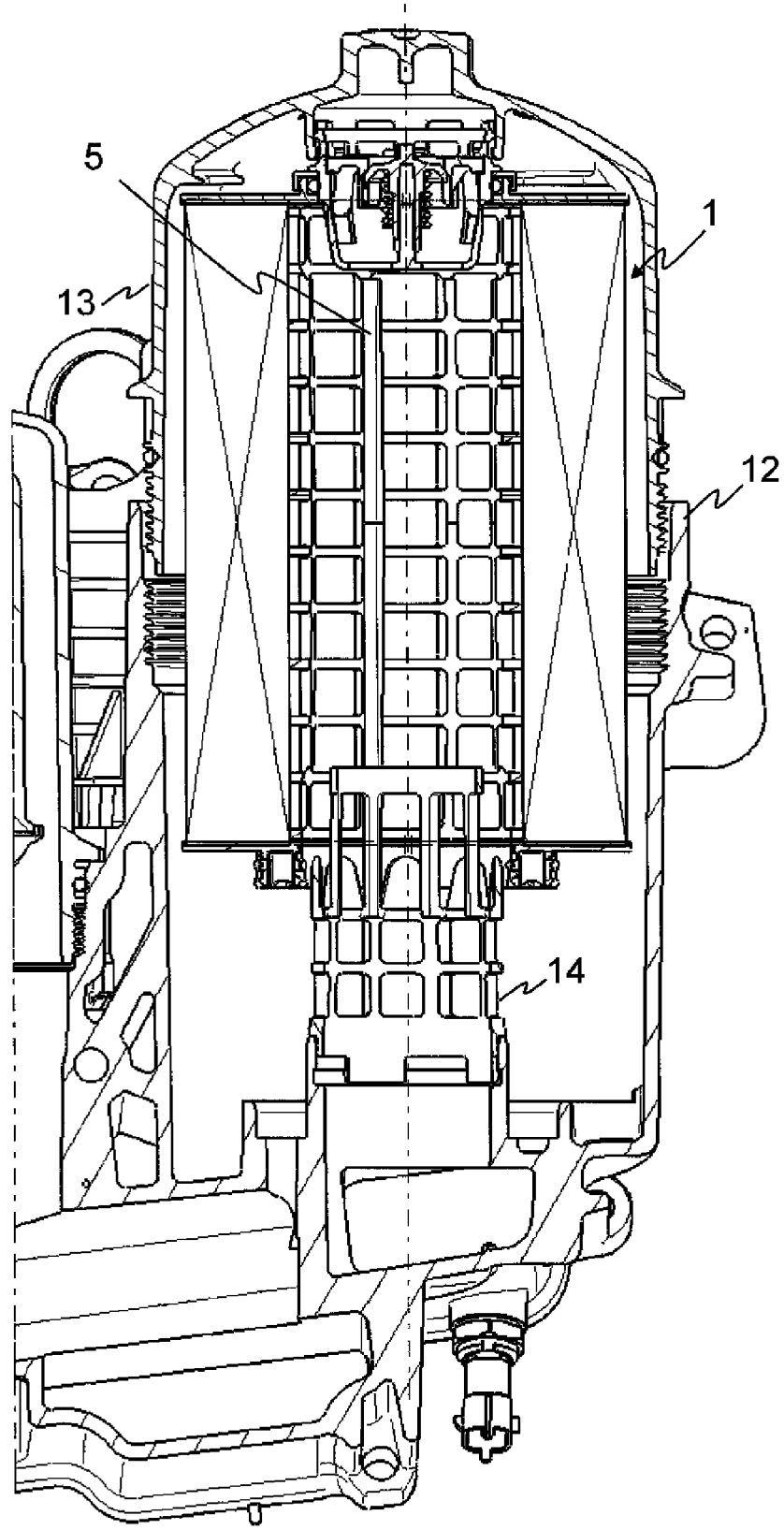
FIG. 10 illustrates a section through a non-operational filter device having a filter element according to FIGS. 1 and 2 and a housing-side support dome according to FIG. 6.

FIG. 10 illustrates a non-operational filter device 11 for liquid filtration having a filter housing 12 having a support dome 14 according to FIG. 6. The filter element 1 having the two individual elongated support ribs 5 cannot be completely inserted into the filter housing 12, because the end face-side support surfaces 6 are supported on the installation ribs 5 on the end edge of the support dome 14. The threaded connection between the cover 13 and the filter housing 12 cannot be established, such that it is impossible to initiate operation of the filter device 11 with the non-fitting filter element 1.

What is claimed is:

1. A filter device comprising:
   a filter element comprising:
      a hollow, cylindrical, radial flowthrough-permitting filter medium body;
      a support frame arranged in on a radially inner side of the radial flowthrough-permitting filter medium body;
      at least one end cap arranged on an axial end face of the filter medium body;
      wherein the at least one end cap has a central opening extending axially through the at least one end cap;
      at least one installation rib secured to a radially inner side of the support frame and protruding radially inwardly from the support frame;
      wherein the at least one installation rib extends radially inward further than a radially inner boundary of the central opening in the at least one end cap;
      wherein an end face of the at least one installation rib forms a support surface configured to contact and support the filter element on a support dome projecting through the central opening into an interior of the hollow, cylindrical, radial flowthrough-permitting filter medium body;
      wherein the at least one end cap comprises an annular sealing ring projecting axially outwardly from the at least one end cap in a direction away from the filter medium body, the annular sealing ring circumferentially closing about the central opening of the at least one end cap;
      wherein the annular sealing ring has a radially inner sealing surface and a radially outer sealing surface, such that the seal ring can seal both radially inwardly and outwardly from the annular sealing ring; and
   a support dome comprising:
      a cylindrical base section formed as a circumferential wall having a lattice structure;
         wherein a first axial end of the cylindrical base section has a plurality of spaced apart teeth projecting axially outwardly beyond the first axial end of the cylindrical base section, the plurality of spaced apart teeth uniformly distributed over a circumference of the first axial end face;
         wherein support incisions are formed as axial recesses between adjacent teeth of the plurality of spaced apart teeth;
         wherein the end face of the at least one installation rib is received into the support incisions of cylindrical base section, such that the end face of the at least one installation rib projects into and is received into the support incisions of the cylindrical base section and between the adjacent teeth; and
      a plurality of latching elements formed with and projecting axially outwardly from a second axial end face of the cylindrical base section, the latching elements adapted to latch the support dome into a filter housing; an axially elongated guide section formed as a circumferential wall having a lattice structure;
   a filter housing having interior into which the filter element and support dome are received;
   wherein an axial end face of the guide section contacts the support surface of the at least one installation rib;
   a pot shaped filter housing cover.

2. The filter device according to claim 1, wherein the at least one installation rib is a plurality of installation ribs are arranged on the support frame of the filter element and a plurality of counter-support elements are arranged on an end face of the support dome.

3. The filter element according to one of claim 1, wherein the end face of the at least one installation rib that forms the support surface is arranged axially spaced apart from an adjacent axial end face of the filter medium body.

4. The filter element according to one of claim 1, wherein the at least one installation rib runs along a longitudinal brace of the support frame that extends in the axial direction.

5. A support dome for a filter element, comprising:
   a cylindrical base section formed as a circumferential wall having a lattice structure;
      wherein a first axial end of the cylindrical base section has a plurality of spaced apart teeth projecting axially outwardly beyond the first axial end of the cylindrical base section, the plurality of spaced apart teeth uniformly distributed over a circumference of the first axial end face;
      wherein support incisions are formed as axial recesses arranged between adjacent teeth of the plurality of spaced apart teeth;
      wherein the cylindrical base section further includes an axially elongated guide section which is cylindrical or conical, the axially elongated guide section arranged concentrically at a radial interior of the cylindrical base section, the cylindrical base section having a larger outside diameter than the axially elongated guide section, the axially elongated guide section having an axial free end projecting axially outwardly beyond the first axial end face of the cylindrical base section and beyond the plurality of spaced apart teeth;
   a plurality of latching elements formed with and projecting axially outwardly from a second axial end face of the cylindrical base section, the latching elements adapted to latch the support dome into a filter housing.

* * * * *